(12) United States Patent
Wu

(10) Patent No.: US 9,584,255 B1
(45) Date of Patent: Feb. 28, 2017

(54) METHOD AND APPARATUS FOR TRANSMITTING AND RECEIVING PACKETS IN A WIRELESS COMMUNICATION NETWORK

(71) Applicant: Marvell International LTD., Hamilton (BM)

(72) Inventor: Songping Wu, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 155 days.

(21) Appl. No.: 14/556,567

(22) Filed: Dec. 1, 2014

Related U.S. Application Data

(60) Provisional application No. 61/916,630, filed on Dec. 16, 2013.

(51) Int. Cl.
*H04L 1/00* (2006.01)

(52) U.S. Cl.
CPC .......... *H04L 1/0013* (2013.01); *H04L 1/0002* (2013.01)

(58) Field of Classification Search
None
See application file for complete search history.

(56) References Cited

U.S. PATENT DOCUMENTS

| | | | |
|---|---|---|---|
| 9,008,066 B2* | 4/2015 | Taghavi Nasrabadi .. | H04B 1/69 370/341 |
| 2009/0089577 A1* | 4/2009 | Shon ................... | H04L 63/0428 713/160 |
| 2009/0116462 A1* | 5/2009 | Powell ................. | H04B 1/707 370/338 |
| 2012/0163480 A1* | 6/2012 | Nemeth ................ | H04B 1/707 375/259 |
| 2013/0202014 A1* | 8/2013 | Schmidl ................ | H04B 1/707 375/147 |

OTHER PUBLICATIONS

ZigBee/IEEE 802.15.4 Summary; Sinem Coleri Ergen; Sep. 10, 2004.

* cited by examiner

*Primary Examiner* — Candal Elpenord

(57) ABSTRACT

A first network device including a medium access control module and a physical layer module. The medium access control module is configured to generate a frame to include a first header, a second header and a payload. The first header indicates a start of the frame for a second network device. The second header indicates a length of the payload for the second network device. The payload comprises a third header and data. Other than the payload, a format of the frame complies with IEEE 802.15.4. The physical layer module is configured to: receive the frame; repetition code the third header or repetition code the data; generate a signal including (i) the first header, (ii) the second header, and (iii) the repetition coded third header or the repetition coded data; modulate the signal; and transmit the modulated signal to the second network device.

26 Claims, 6 Drawing Sheets

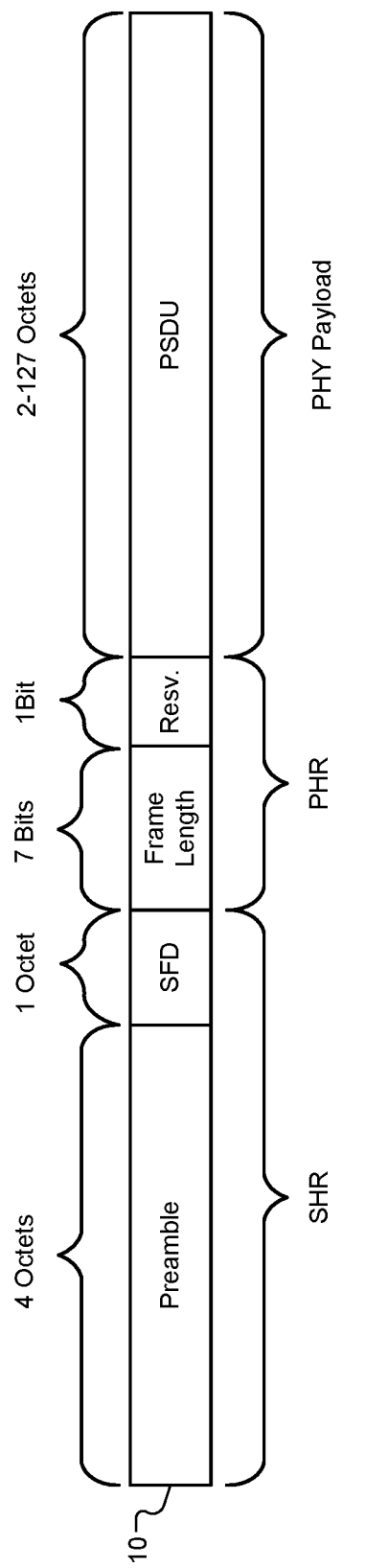
FIG. 1
_Prior Art_

METHOD AND APPARATUS FOR TRANSMITTING AND RECEIVING PACKETS IN A WIRELESS COMMUNICATION NETWORK

CROSS-REFERENCE TO RELATED APPLICATIONS

This application claims the benefit of U.S. Provisional Application No. 61/916,630, filed on Dec. 16, 2013. The entire disclosure of the application referenced above is incorporated herein by reference.

FIELD

The present disclosure relates to wireless networks, and more particularly to wireless transmission and reception according to the IEEE 802.15.4 standard.

BACKGROUND

Wireless systems have been widely adopted for various applications and networks. The applications include medical instruments and equipment, wireless consumer products, wireless equipment used in stores, automotive equipment, control systems, security systems, etc. The networks include personal and commercial communication networks, global positioning system (GPS) networks, cellular networks, broadcasting networks, industrial control networks, wireless local area networks (WLANs), etc. Examples of WLANs are Wi-Fi™ networks, Bluetooth® networks, automobile control and sensor networks, and home and office automation and security networks (e.g., a ZigBee™ network).

Zigbee protocols for wireless communication are being used for the "Internet of things" to provide connectivity and control to various items (e.g., appliances, equipment, sensors, computers, and cellular devices) in a wireless network. Zigbee is a wireless mesh network standard for low-cost and low-power network devices. ZigBee defines a protocol stack that is based on physical layer (PHY) and medium access control (MAC) layer protocols defined in the Institute of Electrical and Electronics Engineers (IEEE) 802.15.4 standard. The protocol stack includes: a network layer that communicates with the MAC layer; a security layer; and an application programming interface (API). The network layer performs address assignment, route discovery, and connection establishment. The network layer supports star, mesh and cluster-tree networks. The security layer provides 32-bit, 64-bit, or 128-bit encryption. The API is in communication with an application layer. The application layer includes application objects, a profile and software associated with a network (or customer) device.

According to IEEE 802.15.4, the PHY layer transmits in an 868 mega-hertz (MHz) band, a 915 MHz band, or a 2.4 giga-hertz (GHz) band. The 868 MHz band includes frequencies 869.0-868.6 MHz and is used in Europe. The 915 MHz band includes frequencies 902-928 MHz and is used in the United States of America. The 2.4 GHz band includes frequencies 2.405-2.480 GHz and is used worldwide.

The IEEE 802.15.4 standard specifies a mandatory mode of operation for the 2.4 GHz band. The mandatory mode of operation includes transmitting data at a data rate of 250 kilo-bits-per-second (kbps). The 2.4 GHz band includes 16 channels. Consecutive ones of the 16 channels are 5 MHz apart from each other. FIG. 1 shows a format of a frame 10 according to IEEE 802.15.4. The frame 10 includes a synchronization header (SHR), a PHY header (PHR), and a PHY payload. The SHR includes a preamble and a start-of-frame delimiter (SFD). The preamble of the frame 10 is used by a receiver to obtain chip and symbol synchronization with an incoming message. The preamble includes 4 bytes (or octets). The 4 bytes include 32 binary zeros. The SFD includes a single byte and indicates an end of the preamble and a start of packet data. The PHR includes a frame length field and a reserved bit. The frame length field includes 7 bits and indicates a total number of bytes of data in the PHY payload. The PHY payload is a PHY service data unit and may include up to 127 bytes of data.

SUMMARY

A first network device is provided and includes a medium access control module and a physical layer module. The medium access control module is configured to generate a frame to include a first header, a second header and a payload. The first header indicates a start of the frame for a second network device. The second header indicates a length of the payload for the second network device. The payload comprises a third header and data. Other than the payload, a format of the frame complies with IEEE 802.15.4. The physical layer module is configured to: receive the frame; repetition code the third header or repetition code the data; generate a signal including (i) the first header, (ii) the second header, and (iii) the repetition coded third header or the repetition coded data; modulate the signal; and transmit the modulated signal to the second network device.

In other features, a first network device is provided and includes a physical layer module and a medium access control module. The physical layer module is configured to receive a modulated signal from a second network device. The modulated signal includes a frame. The frame includes a first header, a second header, and a payload. The payload includes data. Other than the payload, a format of the frame complies with IEEE 802.15.4. The physical layer module is configured to (i) synchronize to the modulated signal based on the first header, (ii) determine a length of the payload based on the second header, and (iii) based on whether the payload includes a third header, (a) repetition decode the third header or the data, (b) decode the payload according to IEEE 802.15.4, or (c) refrain from transmitting to the second network device or a third network device. The medium access control module is configured to, based on whether the physical layer module decodes the frame, receive the decoded frame from the physical layer module.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 1 is a block diagram illustrating a format of a frame according to IEEE 802.15.4.

In the drawings, reference numbers may be reused to identify similar and/or identical elements.

DESCRIPTION

A protocol stack and a MAC layer of a network device may generate a frame of data according to ZigBee and IEEE 802.15.4 standards. A PHY layer of the network device may receive the frame of data from the MAC layer and map bits of the data to chip values ($c_0\ c_1\ c_2 \ldots c_{29}\ c_{30}\ c_{31}$). The frame of data may be divided into 16 symbols (identified as symbols 0-15 in Table 1), where each of the symbols includes 4 bits ($b_0\ b_1\ b_2\ b_3$).

TABLE 1

Frame-to-Chip Value Mapping

| Data Symbol (decimal) | Data Symbol (binary) ($b_0\ b_1\ b_2\ b_3$) | Binary Chip Values ($c_0\ c_1\ c_2 \ldots c_{29}\ c_{30}\ c_{31}$) |
|---|---|---|
| 0 | 0 0 0 0 | 1 1 0 1 1 0 0 1 1 1 0 0 0 0 1 1 0 1 0 1 0 0 1 0 0 0 1 0 1 1 1 0 |
| 1 | 1 0 0 0 | 1 1 1 0 1 1 0 1 1 0 0 1 1 1 0 0 0 0 1 1 0 1 0 1 0 0 1 0 0 0 1 0 |
| 2 | 0 1 0 0 | 0 0 1 0 1 1 1 0 1 1 0 1 1 0 0 1 1 1 0 0 0 0 1 1 0 1 0 1 0 0 1 0 |
| 3 | 1 1 0 0 | 0 0 1 0 0 0 1 0 1 1 1 0 1 1 0 1 1 0 0 1 1 1 0 0 0 0 1 1 0 1 0 1 |
| 4 | 0 0 1 0 | 0 1 0 1 0 0 1 0 0 0 1 0 1 1 1 0 1 1 0 1 1 0 0 1 1 1 0 0 0 0 1 1 |
| 5 | 1 0 1 0 | 0 0 1 1 0 1 0 1 0 0 1 0 0 0 1 0 1 1 1 0 1 1 0 1 1 0 0 1 1 1 0 0 |
| 6 | 0 1 1 0 | 1 1 0 0 0 0 1 1 0 1 0 1 0 0 1 0 0 0 1 0 1 1 1 0 1 1 0 1 1 0 0 1 |
| 7 | 1 1 1 0 | 1 0 0 1 1 1 0 0 0 0 1 1 0 1 0 1 0 0 1 0 0 0 1 0 1 1 1 0 1 1 0 1 |
| 8 | 0 0 0 1 | 1 0 0 0 1 1 0 0 1 0 0 1 0 1 1 0 0 0 0 0 0 1 1 1 0 1 1 1 1 0 1 1 |
| 9 | 1 0 0 1 | 1 0 1 1 1 0 0 0 1 1 0 0 1 0 0 1 0 1 1 0 0 0 0 0 0 1 1 1 0 1 1 1 |
| 10 | 0 1 0 1 | 0 1 1 1 1 0 1 1 1 0 0 0 1 1 0 0 1 0 0 1 0 1 1 0 0 0 0 0 0 1 1 1 |
| 11 | 1 1 0 1 | 0 1 1 1 0 1 1 1 1 0 1 1 1 0 0 0 1 1 0 0 1 0 0 1 0 1 1 0 0 0 0 0 |
| 12 | 0 0 1 1 | 0 0 0 0 0 1 1 1 0 1 1 1 1 0 1 1 1 0 0 0 1 1 0 0 1 0 0 1 0 1 1 0 |
| 13 | 1 0 1 1 | 0 1 1 0 0 0 0 0 0 1 1 1 0 1 1 1 1 0 1 1 1 0 0 0 1 1 0 0 1 0 0 1 |
| 14 | 0 1 1 1 | 1 0 0 1 0 1 1 0 0 0 0 0 0 1 1 1 0 1 1 1 1 0 1 1 1 0 0 0 1 1 0 0 |
| 15 | 1 1 1 1 | 1 1 0 0 1 0 0 1 0 1 1 0 0 0 0 0 0 1 1 1 0 1 1 1 1 0 1 1 1 0 0 0 |

The PHY layer may then map the symbols 0-15 to the binary chip values ($c_0\ c_1\ c_2 \ldots c_{29}\ c_{30}\ c_{31}$) according to Table 1. Each of the symbols is mapped to respectively provide 32 binary chip values. The chip values may refer to, for example, rectangular pulses having +1 and 0 amplitudes or +1 and −1 amplitudes. Subsequent to the mapping of the symbols to the binary chip values, the binary chip values are modulated using offset quadrature phase-shift keying (OQPSK) modulation. The resulting modulated signal is filtered and transmitted.

Data transmission based on the ZigBee and IEEE 802.15.4 standards is rate and performance limited. This may limit the use of ZigBee and IEEE 802.15.4 standards for certain applications, such as voice command and control applications. Examples are described below that provide increased transmission rates and system performance. The examples include different frame formats, coding and decoding techniques.

Figure 2:
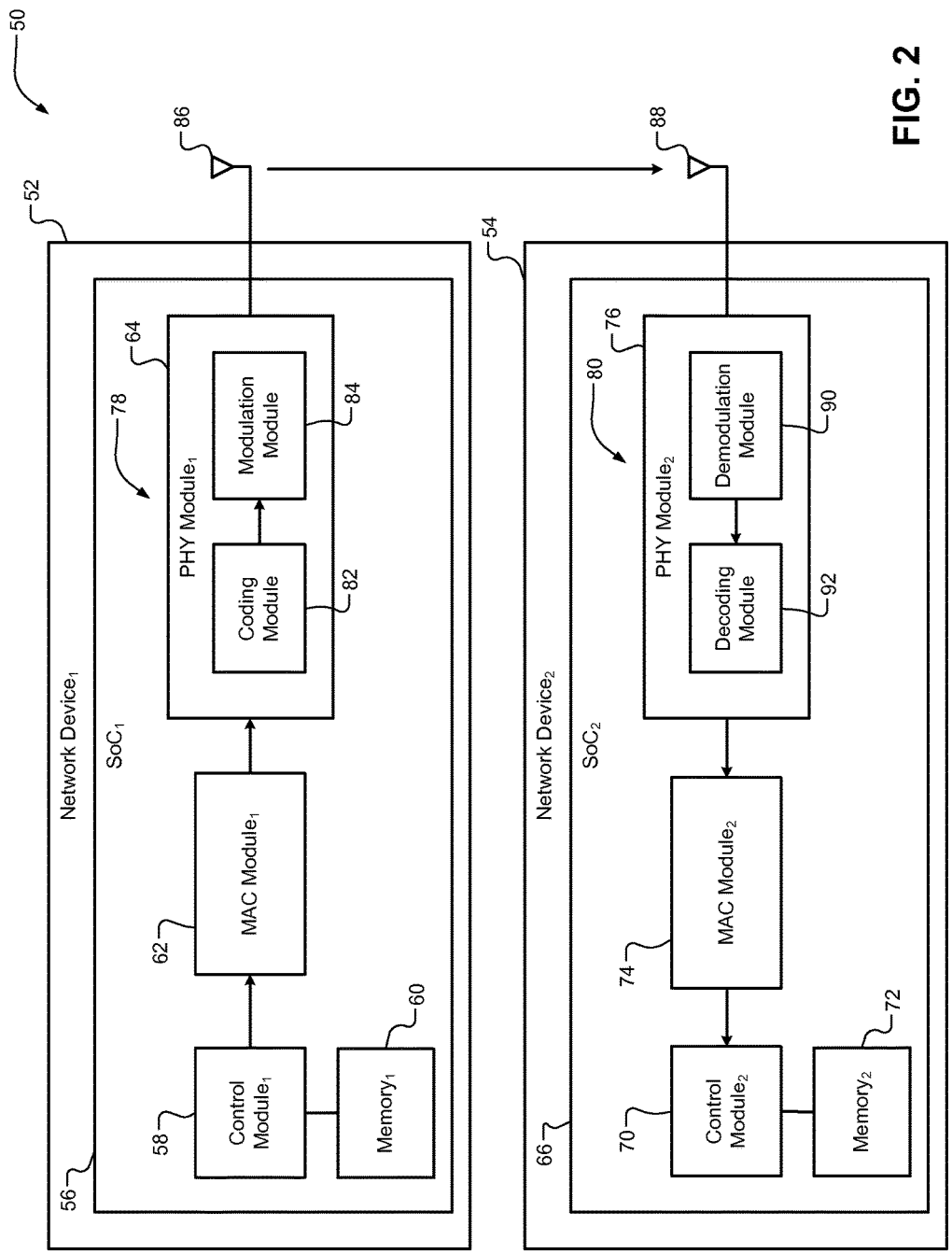
FIG. 2 is a functional block diagram of a wireless system incorporating network devices configured according to an embodiment of the present disclosure.

FIG. 2 shows a wireless system 50 that includes network devices 52, 54. Although two network devices are shown, any number of network devices may be included in the wireless system 50. The wireless system 50 may be used in various applications and may include and/or be implemented in various types of networks. The applications may include medical instruments and equipment, wireless consumer products, wireless equipment used in stores, automotive equipment, control systems, security systems, etc. The networks may include personal and commercial communication networks, global positioning system (GPS) networks, cellular networks, broadcasting networks, industrial control networks, wireless local area networks (WLANs), etc. Examples of WLANs are Wi-Fi networks, Bluetooth® networks, automobile control and sensor networks, and home and office automation and security networks (e.g., a ZigBee network).

The network devices 52, 54 may be, for example, computers, mobile devices, cellular devices, appliances, instruments, products, security equipment, toys, etc. Also, although the first network device 52 is shown as a transmitting device and the second network device 54 is shown as a receiving device, each of the network devices 52, 54 may be configured to both transmit and receive signals according to the various modes of operation disclosed herein.

The first network device 52 includes a first system-on-chip (SoC) 56. The first SoC 56 includes a first control module 58, a first memory 60, a first media access control (MAC) module 62, and a first physical layer (PHY) module 64. The first control module 58 may include the modules 62, 64. The second network device 54 includes a second SoC 66. The second SoC 66 includes a second control module 70, a second memory 72, a second MAC module 74, and a second PHY module 76. The second control module 70 may include the modules 74, 76.

Although a transmit path 78 and corresponding modules and devices are shown for the first MAC module 62 and the first PHY module 64, the first MAC module 62 and the first PHY module 64 may include a receive path and corresponding modules and devices similar to the second network device 54. Although a receive path 80 and corresponding modules and devices are shown for the second MAC module 74 and the second PHY module 76, the second MAC module 74 and the second PHY module 76 may include a transmit path and corresponding modules and devices similar to the first network device 52.

The control modules 58, 70 and/or MAC modules 62, 74 may operate according to various wireless system protocols, such as ZigBee protocols, Wi-Fi protocols, Worldwide Interoperability for Microwave Access® (WiMax®) protocols, Long-Term Evolution™ (LTE™) protocols, etc. The PHY modules 64, 76 may operate fully or partially according to the IEEE 802.15.4 standard. In a first mode (mode 1), the PHY modules 64, 76 may operate to fully comply with the IEEE 802.15.4 standard. In other modes (e.g., one of modes 2-4 described below with respect to FIGS. 4-6), the PHY modules 64, 76 may operate to partially comply with the IEEE 802.15.4 standard. In these other modes, different frame formats, data transmission rates, and/or coding and decoding methods may be used than that described in the IEEE 802.15.4 standard. The PHY modules 64, 76 may include and/or be implemented as circuits having one or more amplifiers, filters, mixers, local oscillators, converters (e.g., analog-to-digital (A/D) converters, D/A converters, downconverters, and/or upconverters), equalizers, etc.

The first control module 58 may access data in the memory 60 and forward the data to the first MAC module 62. The first control module 58 may (i) control flow of traffic in the wireless system 50 and between the network devices 52, 54 (and/or between the network device 52 and other network devices in the wireless system 50), and/or (ii) select an operating mode (e.g., one of the above-mentioned modes 1-4). For example, the first control module 58 may select the operating mode based on a predetermined transmission rate, repetition coding type, operating band, and/or other predetermined parameter. Different repetition coding types are described below with respect to FIGS. 4-8. As an alternative to the first control module 58 selecting the operating mode, the first MAC module 62 and/or the first PHY module 64 may select the operating mode. The module that determines the operating mode may indicate the operating mode to the other modules of the first network device 52. The modules 62, 64 operate according to the selected operating mode. The modules 74, 76 may also operate according to the selected operating mode.

In one embodiment, the first network device 52 transmits frames according to the selected operating mode and the second network device 54 detects, receives, demodulates, and decodes the frames. In another embodiment, the first network device 52 transmits a beacon indicating the operating mode and the second network device decodes the frames according to the indicated operating mode. In yet another embodiment, the network devices perform a "handshake" process to determine the operating mode. For example, control modules 58, 70, the MAC modules 62, 74, or the PHY modules 64, 76 exchange information to determine the operating mode. This may include the first network device 52 (one of the modules 58, 62, 64) selecting an operating mode and the second network device 54 (one of the modules 70, 74, 76) requesting a different operating mode. The information may indicate, for example, which operating modes that the network devices 52, 54 are capable of operating and/or transmission rates of the network devices 52, 54.

The first MAC module 62 may receive bits of data from the first control module 58, generate frames, and transmit the frames to the first PHY module 64. Each of the frames may be in a predetermined format according to the selected operating mode. The first PHY module 64 includes a coding module 82 and a modulation module 84. The coding module 82 performs coding on frames received from the first MAC module 62 according to the selected operating mode. The coding may be based on a spreading code, if operating in mode 1 (or according fully to IEEE 802.15.4) or may be based on a repetition code, if operating in one of the other modes (or according partially to IEEE 802.15.4). A spreading code is not used when operating in one of the modes other than mode 1 (e.g., one of the modes 2-4).

The modulation module 84 modulates an output of the coding module 82. The modulation may include converting a baseband signal to a radio frequency signal, which may be transmitted from the first PHY module 64 and received at the second PHY module 76 via antennas 86, 88. The modulation may comply with the IEEE 802.15.4 standard and may include OQPSK modulation. The first PHY module may transmit radio frequency signals in the 2.4 GHz band and/or in one or more bands (or channels) of the 2.4 GHz band.

The second PHY module 76 may receive the RF signal from the first PHY module 64. The second PHY module 76 may tune to the 2.4 GHz band, one or more of the channels of the 2.4 GHz band and/or one or more corresponding center frequencies. One of the modules 70, 74, 76 may determine the operating mode based on, for example: a beacon transmitted by the first PHY module 64; the handshake process, a format of a received frame, and/or a field of a received frame indicating the operating mode. The module that determines the operating mode may indicate the operating mode to the other modules of the second network device 54.

The second PHY module 76 includes a demodulation module 90 and a decoding module 92. The demodulation module 90 demodulates received signals including frames transmitted from the first PHY module 64. The demodulation module 90 may downconvert the RF signal to a baseband signal. The demodulation may comply with the IEEE 802.15.4 standard and may include OQPSK demodulation. The decoding module receives and may decode the demodulated signal. The decoding may include repetition decoding or despreading based on the operating mode. If operating in mode 1 (or according fully to IEEE 802.15.4), then despreading based on a spreading code may be performed. If operating according to one of the other operating modes (or according partially to IEEE 802.15.4), then despreading is not performed and repetition decoding is performed. The second MAC module 74 forwards decoded frames received from the second PHY module 76 to the second control module 70. The second control module 70 may store the frames in the second memory 72.

Figure 3:
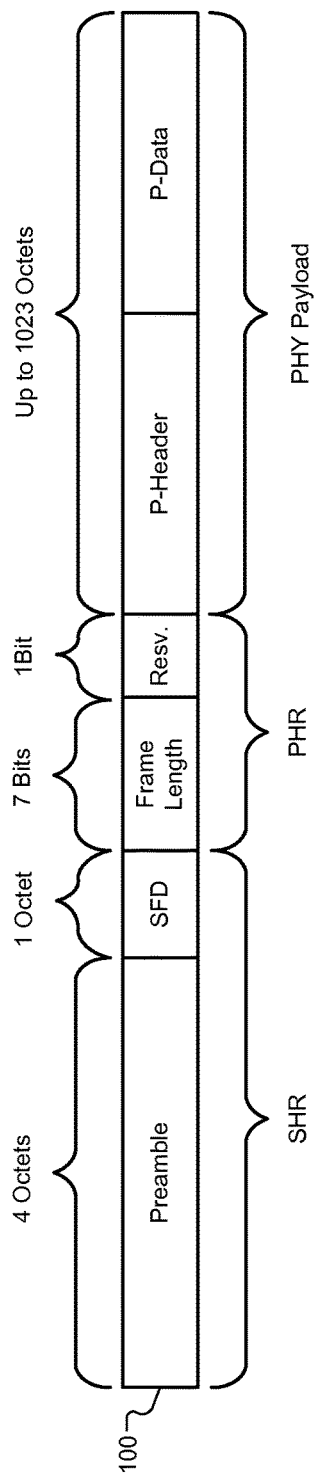
FIG. 3 is a block diagram illustrating a format of a frame according to an embodiment of the present disclosure.

Referring now also to FIG. 3, which shows a format of a frame 100. The frame 100 includes a SHR, a PHR, and a PHY payload. The SHR includes a preamble and a SFD. The preamble indicates a start of a frame and allows a receiver of an incoming signal to acquire and synchronize to the incoming signal, where the incoming signal includes the frame 100. The PHR includes a frame length and a reserved bit. The SHR and the PHR complies with IEEE 802.15.4. The PHR indicates a length of the PHY payload. Formats of the SHR and PHR may be the same as the formats of the SHR and PHR defined in IEEE 802.15.4 for the 2.4 GHz band. The PHY payload, unlike a PHY payload of IEEE 802.15.4, includes a payload header (referred to as P-header) and payload data (referred to as P-data). Although the format of the frame includes the P-header, the P-header does not interfere or conflict with the frame format of IEEE 802.15.4. The P-header has a predetermined bit pattern that is recognizable to network devices capable of operating in at least one or more of the other modes (e.g., one or more of the modes 2-4) disclosed herein.

The P-header may include multiple fields such as a data rate field, a P-data length field, an operating mode field, etc.

Most significant bits (MSBs) of P-header may be utilized as the data rate field. The data rate field may include, for example, 2 bits. If the data rate field has bits '00', then the data rate may be 250 kbps or other predetermined data rate. If the data rate field has bits '01', then the data rate may be 500 kilo-bits-per-second (kbps) or other predetermined data rate. If the data rate field has bits '10', then the data rate may be 1 Mbps or other predetermined data rate. If the data rate field has bits '11', then the data rate may be 2 Mbps or other predetermined data rate.

Lease significant bits (LSBs) of P-header may be utilized as the P-data length field. During transmission of the P-header, the LSBs may be transmitted prior to the MSBs. The P-data length field may include, for example, 10 bits. The P-data length field indicates a length of P-data (e.g., number of bytes of data in P-data). Length of P-data may be up to, for example, 1023 bytes (or octets) or other predetermined maximum number of bytes. The operating mode field, if included, may indicate a selecting operating mode (e.g., one of the operating modes described herein). The P-data may include user data or other data.

Each of the bits in the PHY payload may be repeated, via repetition coding, one or more times. The repetition coding may be performed by the coding module 82 of FIG. 2. The repetition coding may be based on a repetition code (or predetermined pattern of repetition). The repetition coding protects bits in P-header and P-data to assure that P-header and P-data are decoded properly at a receiver (e.g., the second PHY module 76 of FIG. 2). The repetition coding pattern of P-header and P-data may be determined by the coding module 82.

The first PHY module 64 may adjust a rate at which frames and/or data are transmitted based on a selected data rate and/or an amount of repetition coding. As an amount of repetition coding decreases (a number of times one or more bits are repeated), a rate at which frames and/or data are transmitted is increased.

Generation and transmission of P-header, P-data, and/or a frame having a PHY payload with a P-header and P-data does not include use of a spreading code. This is unlike generation and transmission of a frame according to IEEE 802.15.4, as described above with respect to Table 1.

Figure 4:
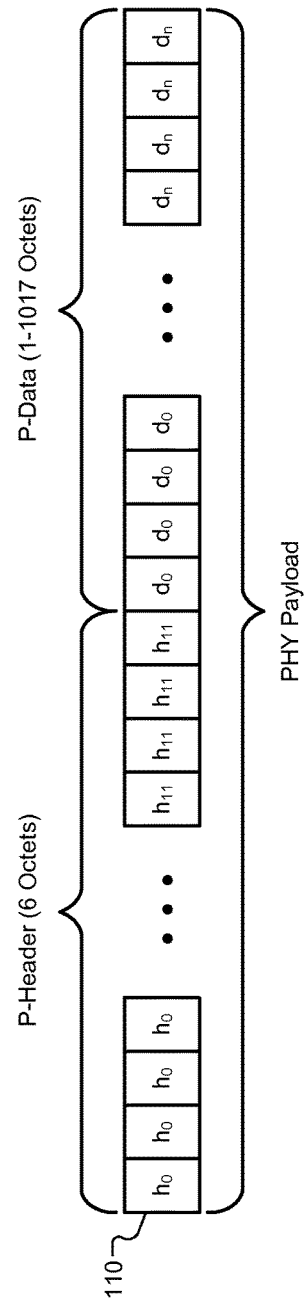
FIG. 4 is a block diagram illustrating a format of a PHY payload including quad-repeated P-header bits and quad-repeated P-data bits in accordance with an embodiment of the present disclosure.

FIG. 4 shows a format of a PHY payload 110. The format of the PHY payload 110 complies with the format of the PHY payload of FIG. 3 and may be used when operating in the second mode (or mode 2). The PHY payload 110 includes a P-header and P-data, where each bit in the P-header (bits $h_0$-$h_{11}$) and P-data (bits $d_0$-$d_n$) is repeated four times. In the example shown, repeated bits of a first bit are transmitted followed by repeated bits of a next consecutive bit. For example, repeated header bits $h_0$, $h_0$, $h_0$, $h_0$ are transmitted prior to the next consecutive repeated header bits $h_1$, $h_1$, $h_1$, $h_1$. P-data is transmitted followed by P-header. Also, in the example, shown, P-header may include 12 repeated bits with a total of 48 bits (or 6 octets). The total number of bits in P-data may be 4*n, where n is the total number of bits of data prior to repetition coding. The transmission rate for mode 2 is 500 kbps.

Figure 5:
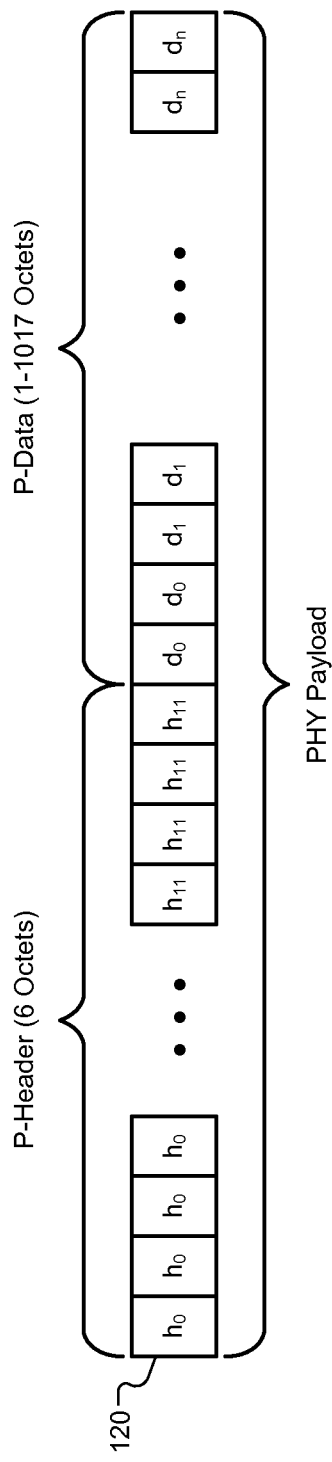
FIG. 5 is a block diagram illustrating a format of a PHY payload including quad-repeated P-header bits and dual-repeated P-data bits in accordance with an embodiment of the present disclosure.

FIG. 5 shows a format of a PHY payload 120. The format of the PHY payload 120 complies with the format of the PHY payload of FIG. 3 and may be used when operating in the third mode (or mode 3). The PHY payload 120 includes a P-header and P-data, where each bit in the P-header (bits $h_0$-$h_{11}$) is repeated four times and each bit in P-data (bits $d_0$-$d_n$) is repeated twice. In the example shown, repeated bits of a first bit are transmitted followed by repeated bits of a next consecutive bit. P-data is transmitted followed by P-header. Also, in the example, shown, P-header may include 12 repeated bits with a total of 48 bits (or 6 octets). The total number of bits in P-data may be 2*n, where n is the total number of bits of data prior to repetition coding. The transmission rate for mode 3 is 1 Mbps.

Figure 6:
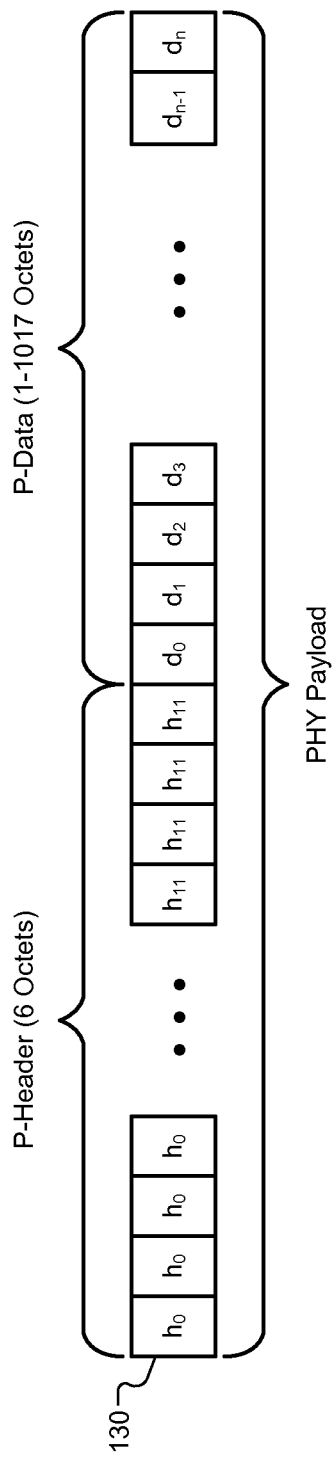
FIG. 6 is a block diagram illustrating a format of a PHY payload including quad-repeated P-header bits and non-repeated P-data bits in accordance with an embodiment of the present disclosure.

FIG. 6 shows a format of a PHY payload 130. The format of the PHY payload 130 complies with the format of the PHY payload of FIG. 3 and may be used when operating in the fourth mode (or mode 4). The PHY payload 130 includes a P-header and P-data, where each bit in the P-header (bits $h_0$-$h_{11}$) is repeated four times and each bit in P-data (bits $d_0$-$d_n$) is not repeated. In the example shown and for P-header, repeated bits of a first bit are transmitted followed by repeated bits of a next consecutive bit. The bits of P-data are transmitted subsequent to the bits of P-header and in a consecutive order. Also, in the example, shown, P-header may include 12 repeated bits with a total of 48 bits (or 6 octets). The total number of bits in P-data may be 2*n, where n is the total number of bits of data prior to repetition coding. The transmission rate for mode 3 is 1 Mbps.

Figure 7:
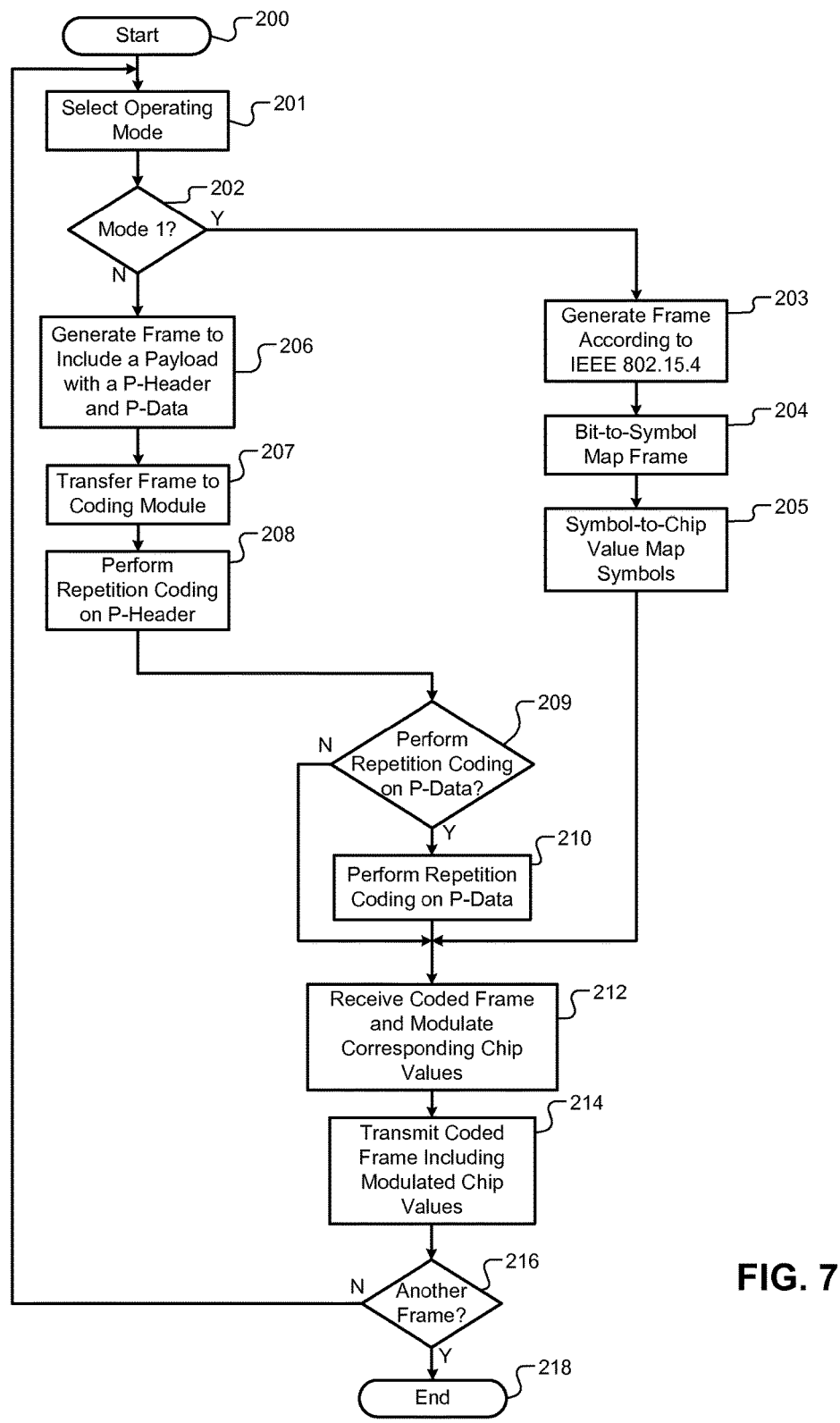
FIG. 7 illustrates a transmission method in accordance with an embodiment of the present disclosure.
Figure 8:
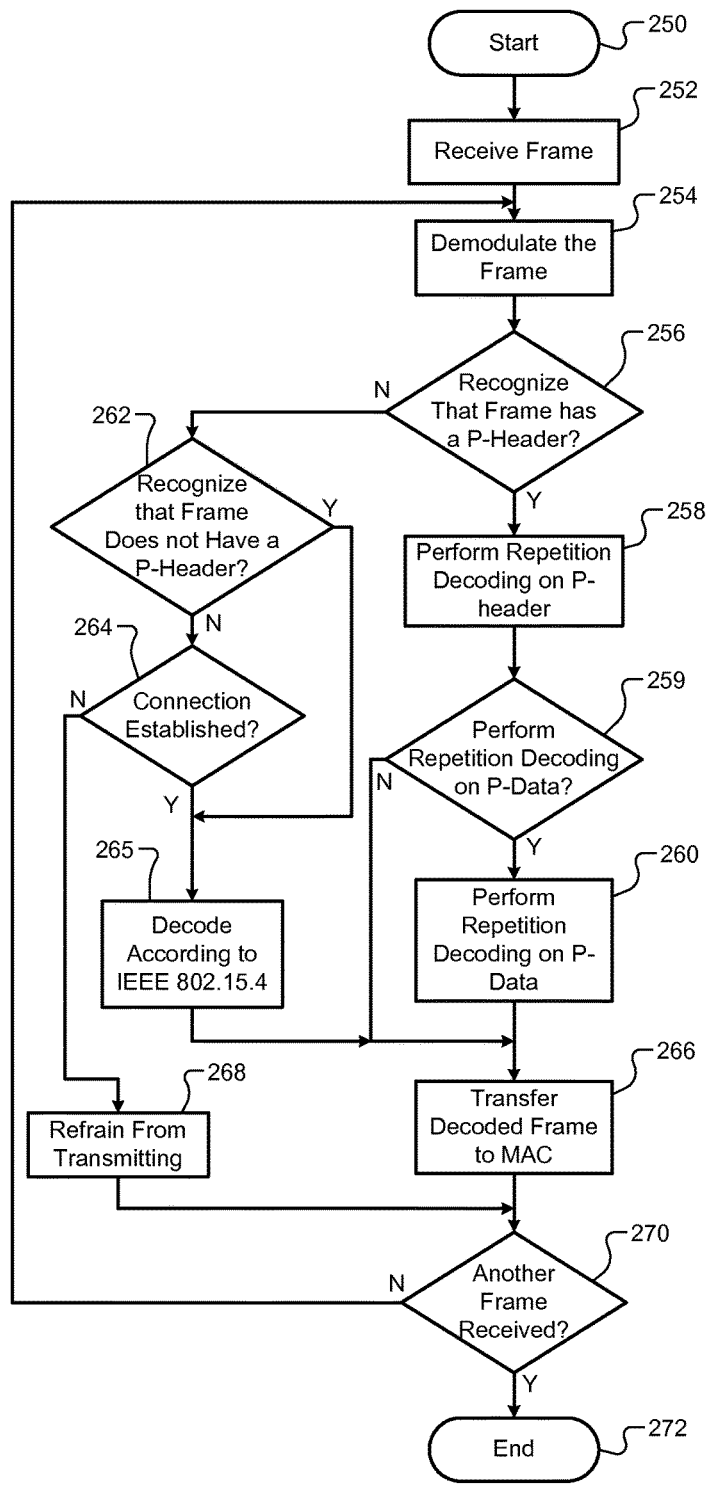
FIG. 8 illustrates a reception method in accordance with an embodiment of the present disclosure.

The network devices 52, 54 disclosed herein may be operated using numerous methods, example methods are illustrated in FIGS. 7-8. In FIG. 7, a transmission method is shown. Although the following tasks are primarily described with respect to the implementations of FIGS. 2-6, the tasks may be easily modified to apply to other implementations of the present disclosure. The tasks may be iteratively performed.

The method may begin at 200. At 201, one of the modules 58, 62, 64 selects an operating mode as described above. This may include communication with the second network device 54 and/or performance of the hand-shake process. At 202, if mode 1 is selected, task 203 is performed, otherwise task 206 is performed. At 203, the first control module 58 and/or first MAC module 62 generates a frame according to IEEE 802.15.4. At 204, the first PHY module 64 and/or the coding module 82 performs bit-to-symbol mapping of the frame, as described above with respect to Table 1. At task 205, the first PHY module 64 and/or the coding module 82 performs symbol-to-chip value mapping of the symbols to generate a coded frame, as described above with respect to Table 1. The coded frame may have, for example, 32 chip values for each symbol. Task 212 may be performed subsequent to task 205.

At 206, the first MAC module 62, according to the selected operating mode, generates a frame. The frame may have one of the frame formats provided in one or more of FIGS. 3-6. Although modes 2-4 are described above with respect to FIGS. 4-6, other modes may be selected that comply with the frame format shown in FIG. 3. The frame generated at 206 may comply with one of the modes 2-4 or to another mode complying with the frame format of FIG. 3. The frame generated at 206 includes a P-header and P-data. Other than a payload of the frame, a format of the frame is according to IEEE 802.15.4. This is because: (i) the payload includes the P-header, which is not included in a frame that complies with IEEE 802.15.4, and (ii) lengths of the payload and/or the P-data may be respectively longer than lengths of a payload and/or data of a frame according to IEEE 802.15.4.

At 207, the frame generated at 206 is forwarded to the coding module 82. At 208, the coding module 82 performs repetition coding on the P-header of the frame generated at 206. The repetition coding may include the repetition coding described above with respect to FIGS. 3-6 or other repetition coding.

At 209, the coding module 82 may determine whether to perform repetition coding on P-data of the frame generated at 206. If repetition coding is to be performed, task 210 is performed, otherwise task 212 is performed. At 210, the coding module 82 performs repetition coding on P-data. The repetition coding may include the repetition coding described above with respect to FIGS. 3-6 or other repetition coding. Results of the repetition coding provided at 208 and 210 may provide repeated bits, which may be provided as chip values (or a set of chip values). The same number of chip values may be provided as the total number of repeated bits. A bit that is repeated, for example, four times has four corresponding chip values. If repetition coding is not performed for P-data, then the bits of P-data may be provided as chip values, where for each bit value a single chip value is provided. Although not shown in FIG. 7, repetition coding may not be performed for the P-header. As a result, a single chip value may be provided for each bit of P-header. A coded frame is provided as a result of tasks 207-210 and at an end of task 208 or task 210 to the modulation module 84.

At 212, the modulation module 84 receives and modulates the coded frame generated as a result of performing tasks 203-205 or as a result of performing tasks 207-210. At 214, the first PHY module 64 transmits the modulated frame to the second PHY module 76.

At 216, if another frame is to be generated, task 201 may be performed as shown, or one of tasks 203, 206 may be performed. Although task 216 is shown as being performed subsequent to task 201-214, frames may be generated while other frames are being transmitted. The method may end at 218 if no further frames are to be generated and transmitted.

In FIG. 8, a reception method is shown. Although the following tasks are primarily described with respect to the implementations of FIGS. 2-6, the tasks may be easily modified to apply to other implementations of the present disclosure. The tasks may be iteratively performed. Some of the tasks of FIG. 8 may be performed by the second network device 54 while some of the tasks of FIG. 7 are performed by the first network device 52.

The method may begin at 250. Although the following tasks are described without performing mode selection, mode selection may be performed as described above and prior to performing task 252. At 252, a second PHY module (e.g., the second PHY module 76) of a second network device (e.g., the second network device 54) receives the modulated frame transmitted by the first network device 52. At 254, a demodulation module (e.g., the demodulation module 90) demodulates the received frame. At 256, if the second PHY module and/or the decoding module is configured to recognize a frame having a P-header, the second PHY module and/or the decoding module determines whether the received frame has a P-header. If the frame has a P-header, task 258 is performed, otherwise task 262 may be performed.

At 258, the decoding module performs repetition decoding on the P-header according to the selected and/or indicated operating mode. At 259, the decoding module determines whether to perform repetition decoding on P-data according to the selected and/or indicated operating mode. If repetition decoding on P-data is to be performed, task 260 is performed, otherwise task 266 is performed. Although not shown in FIG. 8, repetition decoding may not be performed on P-header. As a result, task 258 may not be performed. At 260, the decoding module performs repetition decoding on P-data.

At 262, if the second PHY module and/or the decoding module is configured to recognize that the received frame does not have a P-header, then task 265 is performed, otherwise task 264 may be performed. At 264, the second PHY module and/or the decoding module may determine whether a connection has been established between the first network device 52 and the second network device. Establishment of a connection may indicate whether the frame has a P-header. If a connection is established and the second PHY module and/or the decoding module is unable to recognize whether the frame has a P-header, then the frame may not have a P-header. If a connection was not established and the second PHY module and/or the decoding module is unable to recognize whether the frame has a P-header, then the frame may have a P-header.

Task 265 may be performed if a connection has been established. Task 268 may be performed, if a connection has not been established. At 268, the second PHY module may refrain from transmitting frames to the first network device 52 and/or other network device to prevent interference with communication between the first network device 52 and another (or third) network device. Task 266 may be performed subsequent to tasks 260 and 265.

If the second network device is not capable of recognizing whether a received frame has a P-header, the second PHY module and/or decoding module may not perform one or more of tasks 256, 262, 264 and may simply perform task 268 subsequent to task 254. This may be based on the decoding module determining that the decoding module is unable to decode the received frame.

At 266, the second PHY module and/or the decoding module transfers a decoded frame to a second MAC module (e.g., the second MAC module 74). The decoded frame transferred at 266 may be the decoded frame provided as a result of performing tasks 258-260 or as a result of performing task 265.

Task 270 may be performed subsequent to tasks 266, 268. At 270, the second PHY module determines whether another frame is received. If another frame is received task 254 may be performed, otherwise task the method may end at 272.

The above-described tasks of FIGS. 6-8 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-described examples at least partially comply with IEEE 802.15.4, allow for transmitting and receiving data at multiple data transmission rates, and allow for increased data throughput. The above-described examples provide improved support for voice and data communications, which can require data rates of more than 1 megabit-per-second (1 Mbps). Network devices operating according to these examples exhibit (i) negligible differences in signal sensitivity levels over network devices operating according fully to IEEE 802.15.4, and (ii) better signal sensitivity levels than, for example, network devices operating according to Bluetooth®.

The wireless communications described in the present disclosure can be conducted in full or partial compliance with IEEE standard 802.11-2012 and/or 802.15.4.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A first network device comprising:
 a medium access control module configured to generate a frame to include a first header, a second header and a payload, wherein the first header indicates a start of the frame for a second network device, wherein the second header indicates a length of the payload for the second network device, wherein the payload comprises a third header and data, wherein, other than the payload, a format of the frame complies with Institute of Electrical and Electronics Engineers (IEEE) 802.15.4, and wherein a format of the payload does not comply with IEEE 802.15.4; and
 a physical layer module configured to
  receive the frame,
  repetition code the third header or repetition code the data,
  generate a signal including (i) the first header, (ii) the second header, and (iii) the repetition coded third header or the repetition coded data,
  modulate the signal, and
  transmit the modulated signal to the second network device.

2. The first network device of claim 1, wherein:
 the third header indicates a data rate and a length of the data; and
 the physical layer module is configured to transmit, to the second network device and at the data rate, the repetition coded third header or the repetition coded data.

3. The first network device of claim 1, wherein the physical layer module is configured to repetition code the third header and not the data.

4. The first network device of claim 1, wherein the physical layer module is configured to repetition code the third header and the data.

5. The first network device of claim 1, wherein the physical layer module is configured to (i) determine whether to repetition code the third header or the data, and (ii) based on whether the third header or the data is to be repetition coded, adjust a data rate at which the physical layer module is to transmit the modulated signal.

6. The first network device of claim 1, wherein the physical layer module is configured to (i) determine a repetition code pattern of the third header or the data, and (ii) based on the repetition code pattern, adjust a data rate at which the physical layer module is to transmit the modulated signal.

7. The first network device of claim 1, wherein the physical layer module is configured to, based on an amount of repetition coding of the third header or the data, increase a data rate at which the physical layer module transmits the modulated signal.

8. The first network device of claim 1, wherein the physical layer module is configured to increase a data rate at which the physical layer module transmits the modulated signal while decreasing an amount of repetition coding of the third header or the data.

9. The first network device of claim 1, wherein the physical layer module comprises:
a coding module configured to (i) repetition code the third header or the data to generate a repetition coded frame, and (ii) generate chip values based on the repetition coded frame; and
a modulation module configured to modulate the chip values to generate the modulated signal.

10. The first network device of claim 9, wherein a number of bits in the repetition coded frame is equal to a number of the chip values generated based on the repetition coded frame.

11. The first network device of claim 1, wherein the physical layer module is configured to when repetition coding the third header or the data, repeats bits of the third header or the data.

12. The first network device of claim 1, wherein the physical layer module is configured to repetition code the third header or the data based on a predetermined pattern of repetition.

13. The first network device of claim 1, wherein the physical layer module is configured to:
repetition code the third header and the data including repeating bits of the third header and repeating bits of the data; and
generate the signal to include the repeated bits of the third header and the repeated bits of the data.

14. The first network device of claim 1, wherein the repetition coding of the third header or the data is performed such that each bit in the third header and each bit of the data is repeated a predetermined number of times.

15. The first network device of claim 1, wherein the repetition coding of the third header or the data is performed such that:
each bit in the third header is repeated a first predetermined number of times;
each bit of the data is repeated a second predetermined number of times; and
the first predetermined number of times is greater than the second predetermined number of times.

16. The first network device of claim 1, the repetition coding of the third header or the data is performed such that each bit in the third header is repeated a predetermined number of times and each bit of the data is not repeated.

17. A first network device comprising:
a physical layer module configured to receive a modulated signal from a second network device, wherein the modulated signal includes a frame, wherein the frame includes a first header, a second header, and a payload, wherein the payload includes data, wherein, other than the payload, a format of the frame complies with Institute of Electrical and Electronics Engineers (IEEE) 802.15.4, wherein a format of the payload does not comply with IEEE 802.15.4, and
wherein the physical layer module is configured to (i) synchronize to the modulated signal based on the first header, (ii) determine a length of the payload based on the second header, and (iii) based on whether the payload includes a third header, determine which one of a plurality of operations to perform, and wherein the plurality of operations include (a) repetition decoding the third header or the data, (b) decoding the payload according to IEEE 802.15.4, or (c) refraining from transmitting to the second network device or a third network device; and
a medium access control module configured to, based on whether the physical layer module decodes the frame, receive the decoded frame from the physical layer module.

18. The first network device of claim 17, wherein the physical layer module is configured to, if the payload includes the third header, repetition decode the third header or the data.

19. The first network device of claim 17, wherein the physical layer module is configured to, if the payload does not include the third header, decode the payload according to IEEE 802.15.4.

20. The first network device of claim 17, wherein the physical layer module is configured to, if the payload does not include the third header, refrain from transmitting to the second network device or the third network device.

21. The first network device of claim 17, wherein:
the third header indicates a data rate and a length of the data; and
the physical layer module is configured to, based on the third header, (i) receive the modulated signal at the data rate, and (ii) determine the length of the data.

22. The first network device of claim 17, wherein the physical layer module is configured to repetition decode the third header and not the data.

23. The first network device of claim 17, wherein the physical layer module is configured to repetition decode the third header and the data.

24. The first network device of claim 17, wherein the physical layer module is configured to increase a data rate at which the physical layer module receives the modulated signal while decreasing an amount of repetition decoding of the third header or the data.

25. The first network device of claim 17, wherein the physical layer module comprises:
a demodulation module configured to demodulate the modulated signal to provide chip values of a repetition coded frame; and
a decoding module configured to repetition decode the third header or the data to provide the decoded frame.

26. The first network device of claim 25, wherein a number of bits in the repetition coded frame is equal to a number of the chip values provided as a result of demodulating the modulated signal.

* * * * *